United States Patent
Beardsley et al.

(10) Patent No.: US 6,658,542 B2
(45) Date of Patent: Dec. 2, 2003

(54) METHOD AND SYSTEM FOR CACHING DATA IN A STORAGE SYSTEM

(75) Inventors: Brent Cameron Beardsley, Tucson, AZ (US); Michael Thomas Benhase, Tucson, AZ (US); Robert Louis Morton, Tucson, AZ (US); Kenneth Wayne Todd, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/293,508

(22) Filed: Nov. 13, 2002

(65) Prior Publication Data

US 2003/0070041 A1 Apr. 10, 2003

Related U.S. Application Data

(63) Continuation of application No. 09/261,898, filed on Mar. 3, 1999, now Pat. No. 6,513,097.

(51) Int. Cl.⁷ .............................................. G06F 12/02
(52) U.S. Cl. .............................. 711/162; 714/6; 714/7; 711/112
(58) Field of Search .............................. 711/4, 112, 113, 711/114, 162, 154, 144, 170, 118; 714/6, 7, 13, 15, 16; 707/202, 204, 205; 710/56

(56) References Cited

U.S. PATENT DOCUMENTS

| | | | |
|---|---|---|---|
| 4,888,681 A | 12/1989 | Barnes et al. | 707/101 |
| 4,987,533 A | 1/1991 | Clark et al. | 704/204 |
| 5,237,682 A | 8/1993 | Bendert et al. | 707/205 |
| 5,448,719 A | 9/1995 | Schultz et al. | 711/161 |
| 5,452,444 A | 9/1995 | Solomon et al. | 714/6 |
| 5,488,731 A | 1/1996 | Mendelsohn | 711/114 |
| 5,497,483 A * | 3/1996 | Beardsley et al. | 711/100 |
| 5,504,861 A * | 4/1996 | Crockett et al. | 714/13 |

(List continued on next page.)

FOREIGN PATENT DOCUMENTS

| | | | | |
|---|---|---|---|---|
| EP | 0 570 168 A2 * | 11/1993 | | G06F/11/20 |
| EP | 0 721 162 A2 * | 7/1996 | | G06F/11/20 |
| JP | 7073085 | 3/1995 | | |
| WO | 9321579 | 10/1993 | | |

OTHER PUBLICATIONS

IBM Technical Disclosure Bulletin; Destage Algorithm Transitions with Redundant Arrays of Independent Disks; vol. 38 No. 10, Oct. 1995.
Research Disclosure; Non–Retentive Data Identifier (NRDID); Feb. 1989, No. 298.
U.S. patent application Ser. No. 09/261,824 filed Mar. 3, 1999 (18.40) U.S. patent 6,438,661 issued Aug. 20, 2002.
U.S. patent application Ser. No. 09/261,683 filed Mar. 3, 1999 (18.30); U.S. patent 6,502,174 issued Dec. 31, 2002.

Primary Examiner—Pierre-Miche Bataille
(74) Attorney, Agent, or Firm—David W. Victor; Konrad Raynes Victor & Mann LLP

(57) ABSTRACT

Disclosed is a system and method for caching data. A processor receives data from a host to modify a track in a first storage device. The processor stores a copy of the modified data in a cache and indicates in a second storage device the tracks for which there is modified data in cache. During data recovery operations, the processor processes the second storage device and data therein to determine the tracks for which there was modified data in cache. The processor then marks the determined tracks as failed to prevent data at the determined tracks in the first storage device from being returned in response to a read request until the failure is resolved. In further embodiments, in response to detecting a partial failure within the storage system, the processor would scan the cache to determine tracks for which there is modified data stored in the cache. The processor then stores in the second storage device information indicating the tracks having modified data in cache and schedules the destaging of the modified data from the cache to the first storage device. The processor is further capable of receiving and processing read/write requests directed to the first storage device before all the modified data is destaged from cache.

33 Claims, 5 Drawing Sheets

U.S. PATENT DOCUMENTS

| | | | | |
|---|---|---|---|---|
| 5,524,203 A | | 6/1996 | Abe | 714/6 |
| 5,533,190 A | | 7/1996 | Binford et al. | 714/6 |
| 5,551,003 A | * | 8/1996 | Mattson et al. | 711/136 |
| 5,572,660 A | | 11/1996 | Jones | 714/6 |
| 5,594,836 A | | 1/1997 | Ryu et al. | 706/53 |
| 5,627,990 A | * | 5/1997 | Cord et al. | 711/122 |
| 5,636,359 A | | 6/1997 | Beardsley et al. | 711/122 |
| 5,644,766 A | | 7/1997 | Coy et al. | 707/204 |
| 5,675,781 A | | 10/1997 | Duncan et al. | 707/8 |
| 5,748,874 A | | 5/1998 | Hicksted et al. | 714/24 |
| 5,787,243 A | | 7/1998 | Stiffler | 711/162 |
| 5,835,955 A | | 11/1998 | Dornier et al. | 712/217 |
| 6,035,412 A | * | 3/2000 | Tamer et al. | 714/6 |
| 6,052,797 A | * | 4/2000 | Ofek et al. | 714/6 |
| 6,076,148 A | * | 6/2000 | Kedem | 711/162 |
| 6,237,008 B1 | * | 5/2001 | Beal et al. | 711/162 |
| 6,434,681 B1 | * | 8/2002 | Armangau | 711/162 |

* cited by examiner

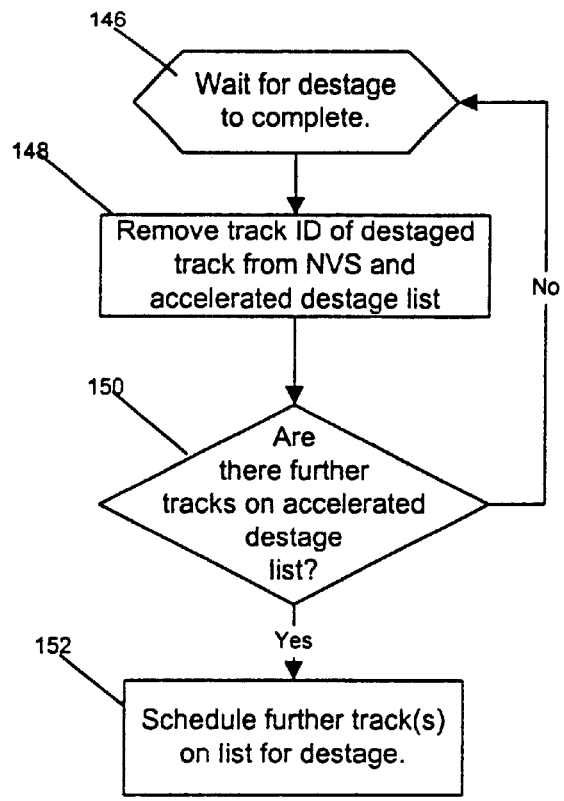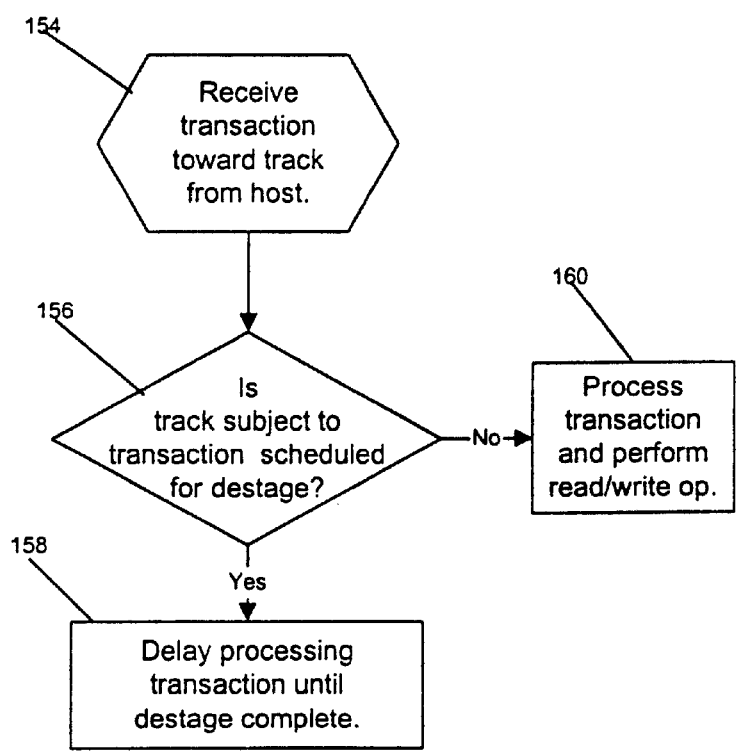
FIG. 4

METHOD AND SYSTEM FOR CACHING DATA IN A STORAGE SYSTEM

RELATED APPLICATIONS

This application is a continuation of U.S. patent application Ser. No. 09/261,898, filed on Mar. 3, 1999 now U.S. Pat. No. 6,513,097 issued on Jan. 28, 2003 patent application is incorporated herein by reference in its entirety.

BACKGROUND OF THE INVENTION

1. Field of the Invention

The present invention relates to a method and system for caching data writes in a storage system and, in particular, maintaining information on the data writes for data recovery purposes.

2. Description of the Related Art

Current storage systems include a cache which receives modified data, i.e., data writes, and a battery backed-up random access memory (RAM), also referred to as a non-volatile storage unit ("NVS"), to backup the modified data maintained in cache. In this way, if the system fails, a copy of modified data may be recovered from NVS. For instance, a storage controller, including a processor, cache and NVS, receives data writes from host systems, such as a mainframe computer, server or other computer system, intended for a Direct Access Storage Device (DASD) managed by the storage controller. In a cache fast write operation, the storage controller receives a data write and writes the received data to cache without writing a copy to the NVS. In a DASD Fast Write operation, the storage controller writes the received data to both the cache and NVS.

During destaging operations, the storage controller writes the modified data in the cache to DASD. If modified data was also written to NVS in a DASD fast write operation, then the storage controller would remove the copy of the destaged data from NVS. Thus, with cache fast write operations, the storage controller risks losing data stored in cache if there is a system failure. Whereas, with DASD fast write operations, if there is a failure, the modified data may be recovered from NVS. Current storage controller systems that utilize the DASD and cache fast write operations include the International Business Machines Corporations 3990 Storage Controller, described in IBM publication, "IBM 3990 Storage Control Reference (Models 1, 2, and 3), IBM document no. GA32-0099-06 (Copyright IBM 1988, 1994), which publication is incorporated herein by reference in its entirety.

Pinned data is data that the storage controller cannot destage because of a failure from the DASD, track format errors or from a failure to read both the cache and the NVS storage copies. Both DASD fast write and cache fast write data can be pinned. Pinned data cannot be removed and the space it occupies cannot be used again until either the problem is fixed, or a host program discards the data or forces the cache to be unavailable. The storage controller attempts to destage pinned data when the track is accessed, or a not-ready-to-ready interrupt is received for the device. Once all the pinned data for a device is cleared, the suspended fast write operations may be resumed. The service representative may have to fix the fault before the data can be destaged.

To preserve data integrity, some current systems utilize the DASD fast write procedure to backup modified data in NVS in case the cache copy of the modified data is lost. This operation of storing modified data in both cache and NVS can consume significant bandwidth, storage, and processor resources to carry out both copy operations. To avoid the costly backup operations to both cache and NVS, certain systems only store modified data in cache. Some systems, only store data in cache, but provide a backup battery to provide cache with power for a brief period of time should the system enter a failover mode. During this brief time that the cache is powered by the backup battery, modified data may be destaged from cache. These systems that only store data in cache risk jeopardizing data integrity in the event that modified data is lost when the battery backing up cache expires, the cache fails or the system shuts-down. Data integrity is jeopardized in such cache-only backup when the modified data is lost in cache because the system will have no knowledge of which data was modified. Consequently, the system could return stale data from storage in response to a read request.

SUMMARY OF THE PREFERRED EMBODIMENTS

To provide an improved data storage system, preferred embodiments disclose a system and method for caching data. A processor receives data from a host to modify a track in a first storage device. The processor stores a copy of the modified data in a cache and indicates in a second storage device the tracks for which there is modified data in cache. During data recovery operations, the processor processes the second storage device and data therein to determine the tracks for which there was modified data in cache. The processor then marks the determined tracks as failed to prevent data at the determined tracks in the first storage device from being returned in response to a read request until the failure is resolved.

Such embodiments conserve system resources because modified data in cache does not have to be backed-up in a second storage device. Moreover, data integrity problems are avoided because in the event of a system failure and loss of the modified data in cache, the processor has information stored in the second storage device on those tracks having modified data in cache before the failure. The processor will not return stale data from the first storage device until the modified data in cache that was lost when the system failed is recovered.

In further embodiments, the processor may determine whether the received data is sequential data or random data before indicating in the second storage device the tracks having modified data in cache. In such case, the processor indicates the tracks having modified sequential data in the second storage device. Further, the processor may store a copy of modified random data in the second storage device.

These further embodiments save bandwidth by avoiding the need to make a second copy of sequential data updates, which can consume a significant amount of bus bandwidth. Moreover, space in the second storage device is further preserved because sequential data updates could flush the second storage device of random data.

In additional embodiments, the processor may handle a partial failure in a storage system by scanning the cache, in response to detecting a partial failure, to determine tracks for which there is modified data stored in the cache. The processor then stores in the second storage device information indicating the tracks having modified data in cache and schedules the destaging of the modified data from the cache to the first storage device. The processor is further capable of receiving and processing read/write requests directed to the first storage device before all the modified data is destaged from cache.

This additional embodiment provides further advantages because in the event of a partial failure, the processor will continue to process read/write transactions while modified data is being destaged from cache. At the same time, data integrity is assured because the second storage device keeps track of modified data in cache. Thus, in the event of a subsequent failure to the system that causes a loss of modified data in cache, the system will maintain in the second storage device information on modified tracks. Further, some of the modified information may have been destaged as a result of the destaging operations. When the system comes back online, the system will have knowledge of which tracks were modified and not destaged. The system may use this information to avoid returning data from the first storage device that is stale as a result of the failure to destage all the modified data from cache.

BRIEF DESCRIPTION OF THE DRAWINGS

Referring now to the drawings in which like reference numbers represent corresponding parts throughout:

FIGS. 3 and 4 illustrate logic implemented in a storage controller to handle a partial failure within the storage controller in accordance with preferred embodiments of the present invention.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Hardware and Software Environment

Figure 1:
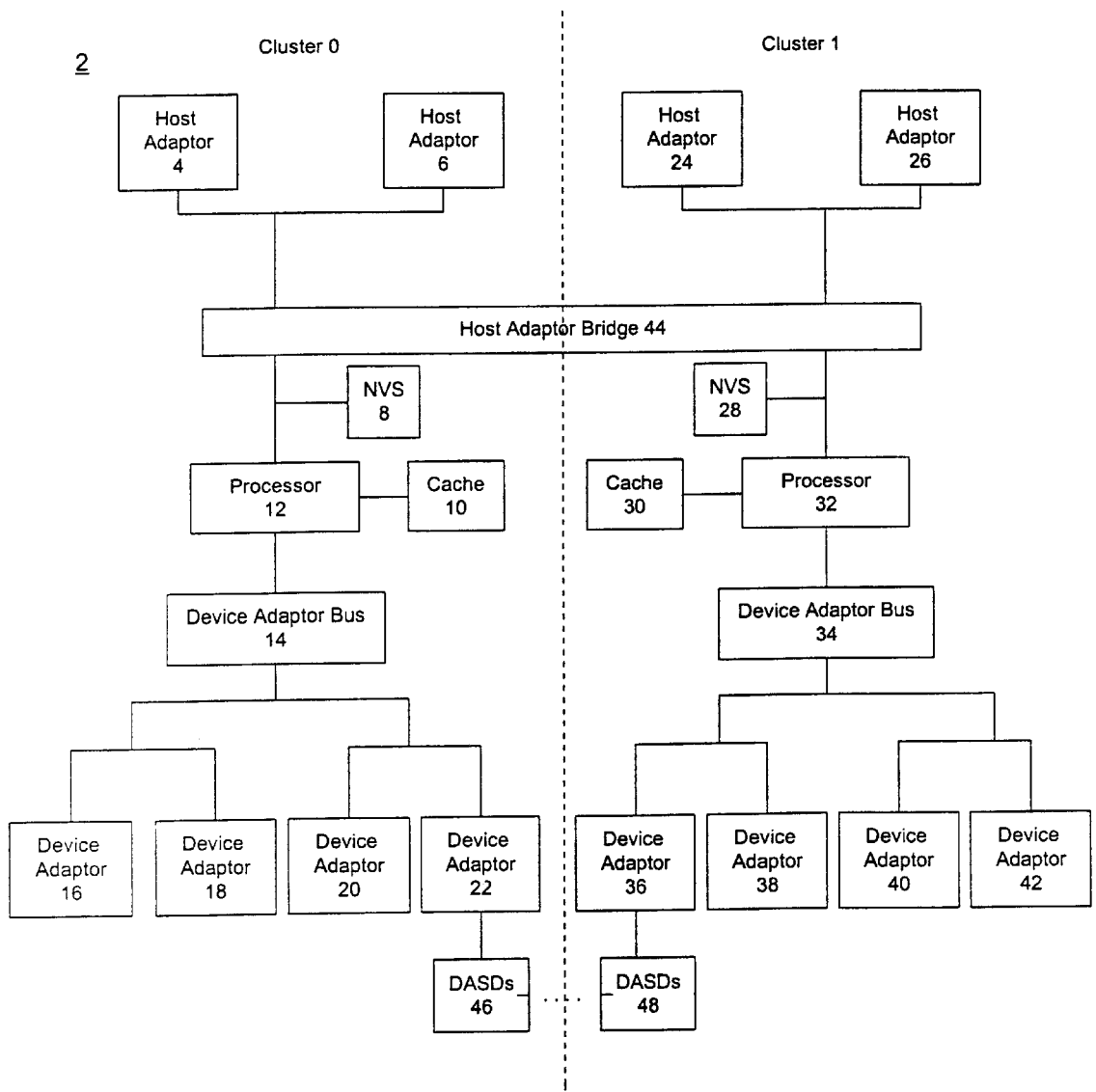
FIG. 1 is a block diagram illustrating a software and hardware environment in which preferred embodiments of the present invention are implemented.

FIG. 1 illustrates a block diagram of the components and architecture of a preferred embodiment of a storage controller 2 which interfaces between host computers or devices (not shown) and DASDs 46, 48. The DASDs may be organized in a redundant array of independent disks, i.e., a RAID array. A RAID array is comprised of multiple, independent disks organized into a large, high-performance logical disk. A controller stripes data across the multiple disks in the array and accesses the disks in parallel to achieve higher data transfer rates. The arrangement and organization of RAID arrays is described in Peter M. Chen, Edward K. Lee, Garth A. Gibson, Randy H. Katz, and David A. Patterson, "RAID: High-Performance, Reliable Secondary Storage," ACM Computing Surveys, Vol. 26, No. 2, June 1994, which is incorporated herein by reference in its entirety. In preferred embodiments, the DASDs are magnetic storage units such as hard disk drives. The host computers and devices are connected to host adaptors 4, 6, 24, 26 via a bus interface (not shown), such as a SCSI bus interface.

The host adaptors 4, 6, 24, 26 may be comprised of an Enterprise System Connection (ESCON) adaptor which provides access to ESCON channels and connections. Each host adaptor 4, 6, 24, 26 may be comprised of a series of host adaptors which connect to a host system.

In preferred embodiments, the storage controller 2 is divided into two clusters, cluster 0 and cluster 1. Cluster 0 consists of host adaptors 4, 6, a non-volatile storage unit (NVS) 8, a cache 10, a processor 12, a device adaptor bus 14, device adaptors 16, 18, 20, 22. Cluster 1 consists of host adaptors 24, 26, an NVS 28, a cache 30, a processor 32, a device adaptor bus 34, and device adaptors 36, 38, 40, 42. A host adaptor bridge 44 interfaces the components of cluster 0 with cluster 1. The host adaptors 4, 6, 24, 26 are connected to the host adaptor bridge 44. In preferred embodiments, the bridge 44 is a dual master bus which may be controlled by one of the processors 12, 32 or one of the host adaptors 4, 6, 24, 26. In further embodiments, the host adaptor bridge 44 may include bridge technology to allow the bus to operate at its own clock speed and provide a buffer to buffer data transferred across the bridge 44. The bridge 44 interconnects the host adaptors 4, 6, 24, 26 with the processors 12, 32. In preferred embodiments the processors 12, 32 are symmetrical multi-processors, such as the IBM RS/6000 processor. Each processor 12, 32 maintains information on the configuration of the other cluster in order to reroute data transfers directed toward the other cluster.

The caches 10, 30 may be external to the processors 12, 32 or included in the processor 12, 32 complex. A processor 12, 32 in one cluster can communicate with the other processor, NVS 8, 28 and cache 10, 30 in the other cluster via the host adaptor bridge 44. In preferred embodiments, the NVS 8, 28 consists of a random access electronic storage, e.g., RAM, with a battery backup. Storage time for a fully charged battery may last a couple of days. In preferred embodiments, the NVS battery is continuously charged whenever primary power is applied during normal operations. The battery will supply power necessary to maintain contents of the NVS 8, 28 intact until power is restored. The cache 10, 30, on the other hand, is a volatile storage unit that cannot maintain data in the event of a power failure.

Device adaptor bus 14 interconnects the processor 12 with the device adaptors 16, 18, 20, 22 and device adaptor bus 34 interconnects processor 32 with device adaptors 36, 38, 40, 42. The device adaptors 16, 18, 20, 22, 36, 38, 40, 42 interface between the storage controller and the DASDs, or RAID array of hard disk drives. In preferred embodiments, the device adaptors 16, 18, 20, 22, 36, 38, 40, 42 employ the Serial Storage Architecture (SSA) developed by IBM. In such case, the DASDs may be interconnected in a loop topology including multiple RAID arrays.

By having one device adaptor from each cluster 0, 1 attached to each loop of DASDs, failure in one cluster and/or the device adaptors associated with the failed cluster will not prevent the functioning cluster from accessing the loop. Thus, no single point of failure in a cluster and/or in a device adaptor will prevent the other cluster from accessing a group of DASDs. Moreover, if a device adaptor, such as device adaptor 22, fails in a cluster that is otherwise functioning properly, then the rerouting to the other device adaptor 36 can occur at the device adaptor level. Alternatively, the failure of a device adaptor can be treated as a failure by the entire cluster, thereby transferring control over to the functioning cluster to access the DASD.

In the storage controller 2 embodiment of FIG. 1, each cluster 0, 1 has four device adaptors, wherein each device adaptor can be connected to two loops, each loop having numerous disks. Thus, the storage capacity of all DASDs attached to the clusters is significant. Each group, or loop, of DASDs attached to a device adaptor 16, 18, 20, 22, 36, 38, 40, 42 includes multiple logical volumes. For memory management purposes, the logical volumes or storage space available in the DASDs attached to a device adaptor can be segregated into logical subsystems (LSS). These LSSs are presented to a host. A device adaptor 16, 18, 20, 22, 36, 38, 40 or 42 can be associated with multiple LSSs, such that the associated device adaptor is responsible for accessing associated LSSs. As discussed, a group of DASDs attached to a pair of device adaptors, such as the loops 54, 56 of disks attached to device adaptors 24, 36 in FIG. 2, can include multiple RAID arrays. Each RAID arrays has multiple logical volumes. The logical volumes associated with a RAID array are mapped to a logical subsystem, which in turn is associated with a device adaptor. Thus, a logical subsystem represents a collection of logical volumes in a RAID array to which a pair of device adaptors are attached.

Further details of the preferred hardware embodiment shown in FIG. 1 and how the system handles failures is described in the commonly assigned patent application, entitled "Failure and Failback System for a Direct Access Storage Device," by Brent C. Beardsley and Michael T. Benhase, Ser. No. 08/988,887, filed on Dec. 11, 1997. An alternative hardware embodiment employing two processors, two caches, and two NVSs to handle failures is described in the commonly assigned patent application, entitled "Failure System for a Multiprocessor Storage Controller," by Brent C. Beardsley, Matthew J. Kalos, Ronald R. Knowlden, Ser. No. 09/026,622, filed on Feb. 20, 1998. Both of these patent applications, which are incorporated herein by reference in their entirety, describe the use of a failover subsystem providing communication paths between a host system and a string of DASDs, and describe hardware embodiments in which preferred embodiments of the present invention may be implemented.

In preferred embodiments, a backup battery (not shown) is attached to the storage controller 2 to power the storage controller 2 for a limited period of time in the event of a power related failure. Such a backup battery may provide power to the system 2 for five minutes or so. Thus, if there is a power failure, the processor 12 or 32 will have a limited period of time to destage data from cache 10 and/or 30 while the backup battery is powering the storage controller 2.

Use of NVS to Maintain Information on Modified Data

The hosts 4, 6, 24, and 26 can write data either sequentially or non-sequentially. Non-sequential data is randomly written or read from DASD tracks. Such non-sequential accesses often occur when an application needs a particular record or data set. Sequential data access occurs when numerous adjacent tracks are accessed, such as for a data backup operation, batch operations or to generate a large report. For instance, a disk backup usually creates one long sequential reference to the entire disk, thus, flooding the cache with data.

Generally, sequential writes consume significantly more overhead, such as bus bandwidth, than random or nonsequential writes as a sequential operation typically involves a longer chain of data. Sequential writes also consume more storage space because sequential data is almost always written to new addressable locations. Random data operations, on the other hand, often involve read and write operations to the same address, thus consuming significantly less cache 10, 30 and NVS 8, 28 resources. Thus, a DASD fast write for sequential data consumes significant bandwidth, NVS and cache space, and processor resources to handle the write because large amounts of data are written to both cache 10 or 30 and NVS 8 or 28. On the other hand, a DASD fast write operation for random (non-sequential) data requires significantly less bandwidth and NVS and cache space given the relatively fewer tracks being written.

However, destaging sequential data from cache 10, 30 takes significantly less time than destaging random data for two reasons. First, with a sequential write in a RAID environment, the parity data can be calculated directly from the sequential write data stored in cache 10, 30. Thus, the processors 12, 32 may calculate the parity data directly from the sequential data in cache 10 or 32 without having to read data from cache 10 or 30. The processor 12 or 32 need only calculate parity and then stripe the sequential data from cache 10, 30 and calculated parity directly to the DASDs 46, 48. However, with a random write operation, to calculate and update parity, which is usually a logical XOR operation, data must be read from the DASDs 46 and 48. In the event that the DASDs 46 and 48 are comprised of hard disk drives, then the disk arm, i.e., actuator, must be moved to read data from the RAID data disks in order to calculate parity. Thus, destaging random data from cache produces latency times for disk drive actuator operations.

Figure 2:
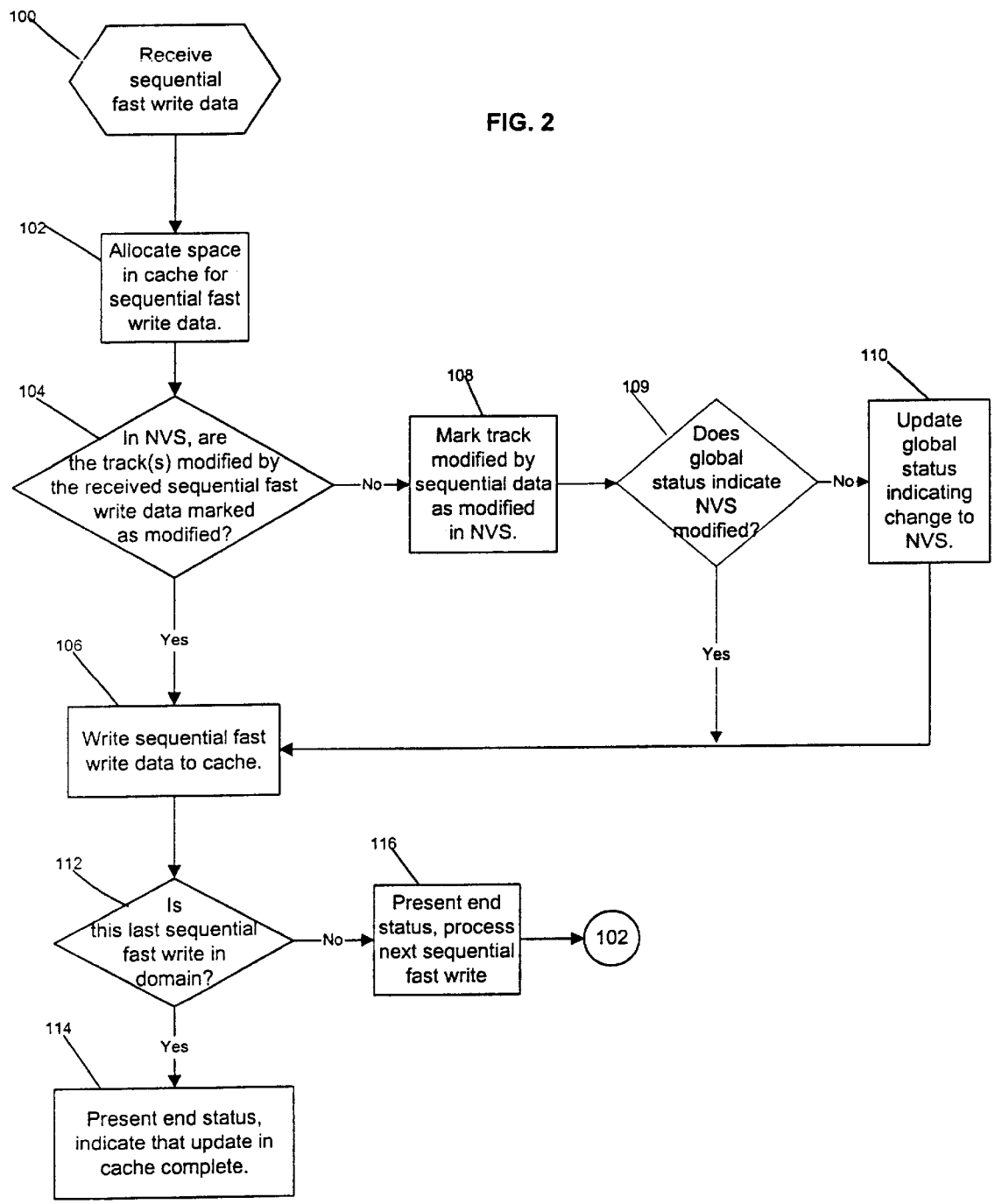
FIG. 2 illustrates logic implemented in a storage controller to maintain information on modified tracks in cache in accordance with preferred embodiments of the present invention.

In preferred embodiments, the DASD fast write operation is modified for sequential fast writes such that only an indication of those tracks having modified data in cache 10 or 30 is stored in NVS, not the actual modified data. For a sequential DASD fast write in accordance with preferred embodiments, the processor 12 or 32 will write a copy of the sequential data to cache 10 or 30 and then store in NVS 8 or 28 the address of the track being updated with the sequential write data ("track ID"). Thus, a list is created in the NVS 8 or 28 of the track IDs of modified sequential data tracks. FIG. 2 illustrates logic implemented within the processors 12 and 32 for handling sequential fast writes. Control begins at block 100 which represents the processor 12 or 32 receiving sequential fast write data. The write command may include information indicating that the write operation in the chain of writes is a sequential fast write. Control transfers to block 102 where the processor 12 or 32 allocates space in the cache 10 or 30 for the sequential fast write data. Control then transfers to block 104 where the processor 10 or 12 determines whether the NVS 8 or 28 already indicates that the track to update with the sequential fast write data has modified data. Track ID information indicating whether modified data for a track is in cache 10 and 30 is maintained in NVS 28 and 8, respectively. When checking if the NVS indicates that the track has modified data, if the data write is to processor 12 and cache 10, then NVS 28 is checked; if the data write is to processor 32 and cache 30, then the NVS 8 is checked.

If the track is marked as modified, then control transfers to block 106 where the processor 12 or 32 writes the sequential fast write data to cache 10 or 30. Otherwise, control transfers to block 108 where the processor 10 or 30 indicates in NVS 28 or 8, respectively, the track which will be updated by the sequential fast write data. Control then transfers to block 109 where the processor 12 or 32 determines whether global status information maintained in the DASD 46 or 48 already indicates that the NVS 8 or 28 was modified. The global status information indicates whether the NVS 8 and 28 include valid modified data. If no, control transfers to block 110 where the processor 10 or 12 updates global status information maintained in DASD 46 or 48 to indicate that the NVS 8 or 28 includes modified data. Otherwise, control transfers to block 106. The global status information in DASD 46 or 48 indicates by logical subsystem (LSS), whether an NVS 8 or 28 includes modified data for that LSS. This information is used during recovery operations, discussed with respect to FIGS. 3 and 4, discussed below. From block 110, control transfers to block 106.

From block 106, control transfers to block 112, where the processor 12 or 32 determines whether the processed sequential fast write is the last in the domain or chain received at block 100. If so, control transfers to block 114 where the processor 12 or 32 presents end status information to the host providing the write at block 100 indicating that the update in cache 10 or 30 is complete. Otherwise, control transfers to block 116 where the processor 12 or 32 presents end status information indicating that the track was updated in cache and then proceeds to process the next sequential fast write at block 102 et seq.

The logic of FIG. 2 for storing the track ID for a sequential fast write operation improves performance over standard DASD fast write operations in which sequential data is written to both cache and NVS, because of the bus bandwidth saved by avoiding having to write a copy of the sequential data to NVS 28. Further, data integrity is maintained because, in the event of a system failure and the loss of modified data in cache 10 or 30, the storage controller 2 will have knowledge of which tracks had modified data in cache that was lost. Thus, the storage controller 2 will not return to the hosts data from DASD 46 or 48 when the cache 10 or 30 included modified data for the requested track before the cache failed.

Further, with the preferred embodiments, significant NVS 8 and 28 space is preserved because sequential data writes are not backed-up in the NVS 8 and 28. Conserving NVS 8 and 28 space prevents the occurrence of the situation where a long chain of sequential writes will push random writes out of NVS 8 and 28. It is advantageous to maintain random data in the NVS backup longer than sequential because, generally, it is easier to recover sequential data than random data. Thus, providing more room in NVS 8 and 28 for random versus sequential data improves the likelihood of data recovery.

In preferred embodiments, during a detection of a fault in the power system or loss of AC power, the backup battery will power the system for a limited period of time, e.g., five minutes. In such case, the processors 12 and 32 will immediately begin destaging sequential data from cache 10 and 30. The NVS 8 and 28 will include a backup copy of any cached random data and the track ID of modified sequential data in cache 10 and 30. The processors 12 and 32, thus, have a limited period of time in which to destage modified data from cache 10 and 30. In preferred embodiments, the storage controller 2 will first destage sequential data from cache as only the track ID of the modified sequential data is backed up in NVS 8 or 28. This is also preferable because it is likely that the storage controller 2 will be able to destage the sequential data from cache during the time the backup battery is powering the system because, as discussed, sequential data may be destaged relatively quickly in comparison to destaging random data, which requires latency for additional disk drive mechanical movements. For instance, if the DASDs 46 and 48 are arranged in a RAID 5 arrangement, sequential data may be destaged from cache 10 and 30 at approximately a rate of 400 Mb per second. Random data from cache, on the other hand, is typically destaged at an approximate rate of 10–20 Mb per second. As discussed, the slower destage time for random data is due largely to the latency resulting from disk set up operations to read data from the data disks to calculate parity.

Thus, with preferred embodiments, the system is likely to destage all modified sequential data from cache 10 and 30 in the event of a power failure during the time the system is powered by the emergency battery. Thus, the risk of not maintaining a backup copy of modified sequential data in NVS 8 or 28 is minimal given the likelihood of being able to destage all modified sequential data from cache 10 and 30 during emergency power from the backup battery. Further, as discussed, not maintaining a backup of modified sequential data in NVS 8 and 28 conserves bus bandwidth, cache 10 and 30 NVS 8 and 28 space, and processor resources. Processor resources are conserved by avoiding having to transfer modified sequential data from the cache 10 and 30 to NVS 8 and 28 and subsequently destage modified sequential data from NVS 8 and 28. Moreover, even if there is not enough time to destage sequential data from cache 10 and 30, sequential data is often readily recreated or recovered.

In the event that the processors 12 and 32 are unable to destage all the modified sequential data from cache 10 or 30, the processors 12 or 32 would pin any data tracks whose track ID was stored in NVS 8 or 28. Once pinned, the track cannot be used until the modified data is recovered or the problem otherwise handled in a manner known in the art.

Recovery for Cluster Failure

In certain embodiments, failover of a cluster, e.g., cluster 0 or 1 shown in FIG. 1, may be handled by taking the host adaptors 4, 6, 24, and 26 offline and returning busy to any host read or write operations until all data is destaged from the cache 10 or 30 in the surviving cluster. One drawback with this method is that the host adaptors 4, 6, 24 and 26 are offline during destage operations thereby preventing the processing of host transactions until all the data is destaged from cache 10 or 30. Such delay in processing host operations may be of economic significance if the host is attempting important business transactions, such as fund transfer operations at a financial institution, reserving airline ticket reservations or processing electronic business transactions.

Figure 3:
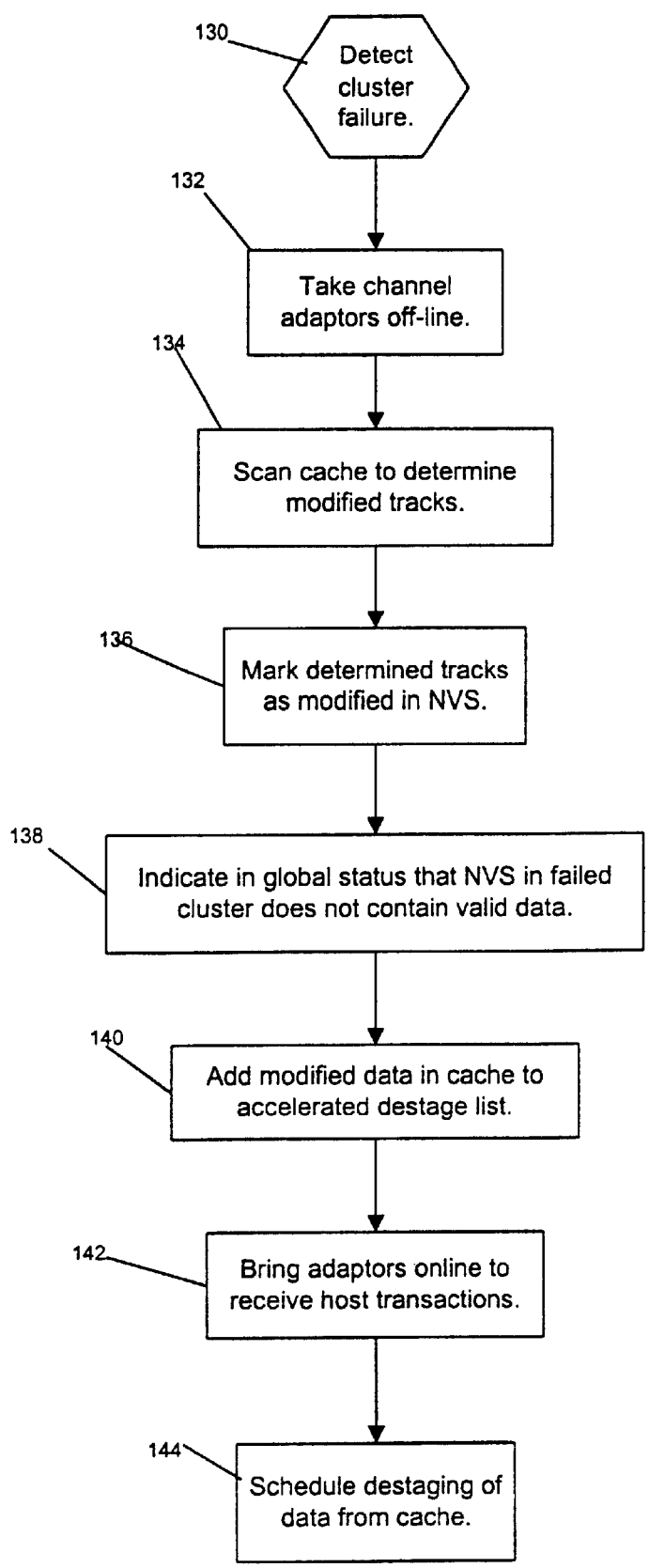

FIG. 3 illustrates logic implemented in the processors 12 or 32 when one of the clusters 0 or 1 fails. The application entitled "Failure and Failback System for a Direct Access Storage Device," Ser. No. 08/988,887, which application was incorporated by reference above, describes further events that occur when a cluster fails. Control begins at block 130 which represents one of the processors 12 or 32 detecting a failure of cluster 1 or 0, respectively. Control transfers to block 132 where the processor in the surviving cluster, e.g., processor 12 in cluster 0 in the case of cluster 1 failing, returns busy to any requests from the host adaptors 4, 6, 24 or 26. Control transfers to block 134 where the processor 12 scans the cache 10 for the address of those tracks having modified data in cache 10. In preferred embodiments, the processor 12 scans for any type of modified data, e.g., both sequential and non-sequential. Control transfers to block 136 where the processor 12 indicates in the NVS 8 the tracks for which there is modified data in cache 10. In preferred embodiments, the processor 12 generates a list in NVS 8 indicating the address or track ID of the tracks having modified data in cache 10. Control then transfers to block 138 where the processor 12 indicates in the global status information in DASD 46, 48 that the NVS in the failed cluster, e.g., NVS 28 in cluster 1, does not contain valid data.

Thus, in preferred embodiments, after indicating that certain tracks have modified data in cache 10, the storage controller 2 will not return to the NVS 28 to recover modified data. Instead, to preserve data integrity, indications of modified tracks in cache 10 are maintained in NVS 8.

After indicating which tracks are modified in NVS 8 and updating the global status information, control transfers to block 140 where the processor 12 indicates that the modified data tracks in cache 10 are on an accelerated destage list to destage from cache 10 DASD 46 or 48. Control then transfers to block 142 where the processor 12 stops returning busy to the host adaptors 4, 6, 24, and 26 and begins to process requests from the host adaptors 4, 6, 24, and 26, i.e., brings the host adaptors back online. Control then transfers to block 144 where the processor 12 schedules destage operations for data tracks in cache 10. Multiple tracks may be scheduled for destage at the same time and destaged in parallel.

FIG. 4 illustrates logic to process requests from the hosts and the completion of destaging operations while data is being destaged from cache as a result of detecting the failure of a cluster at block 130. At block 146, the processor 12 waits for a destage operation of a track to complete. Upon completion, control transfers to block 148 where the processor 12 removes the track ID of the destaged track from the list of modified tracks in NVS 8 and removes the just destaged track from the accelerated destage list. Control then transfers to block 150 where the processor 12 determines whether there are further tracks on the accelerated list to destage. If so, control transfers to block 152 to destage further tracks; otherwise, control transfers to block 146 to wait for any further scheduled destages to complete if all the scheduled destages have not yet completed At block 154 in FIG. 4, the processor 12 waits to receive a host transaction for a track in the DASD 46 or 48. Control transfers to block 156 where the processor 12 determines whether the subject track is scheduled for destage. If so, control transfers to block 158 to delay processing the transaction until the destage has completed. Otherwise, control transfers to block 160 to process the host transaction and perform the requested read/write operation. In preferred embodiments, the processor 12 or 32 may concurrently process instances of threads of the logic beginning at blocks 146 and 154 using parallel processing techniques known in the art.

Figure 5:
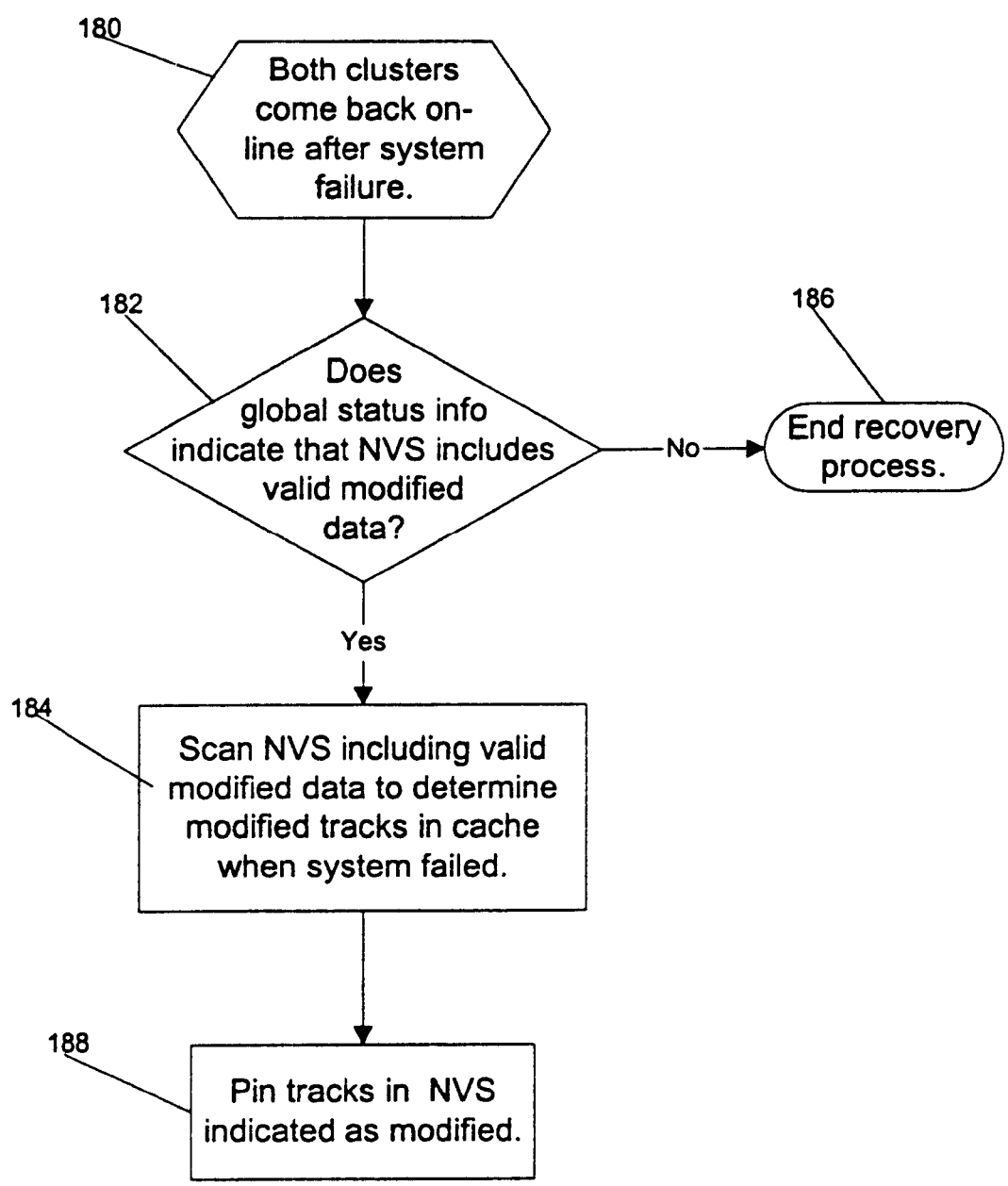
FIG. 5 illustrates logic implemented in a storage controller to handle recovery operations following a failure that causes the system to shut down in accordance with preferred embodiments of the present invention

FIG. 5 illustrates logic implemented in the processor 12 or 32 to handle data recovery in the event the storage controller 2 comes back on-line to the host adaptors 4, 6, 24, and 36 after a failure of both clusters 0 and 1. Control begins at block 180 which represents both clusters 0 and 1 returning on-line after a system wide failure. Control transfers to block 182 where the processor 12 or 32 determines whether the global status info in the DASD 46 or 48 indicates that valid modified data is maintained in the NVS 8 or 28. If so, control transfers to block 184; otherwise, control transfers to block 186 where the recovery process ends as no modified data was in cache 10 and 30 when the entire system 2 was taken off-line as the result of a failure. In other words, at block 186, all the modified data in cache was destaged before the system 2 was taken off-line. At block 184, the processor 10 or 12 scans the NVS 8 or 28 to determine the tracks for which there was modified data in cache 10 or 30 that was not yet destaged when the storage controller 2 went off-line. Control then transfers to block 188 where the processor 10 or 12 pins those tracks that are indicated in NVS 8 or 28 as modified.

The recovery process illustrated in FIGS. 3 and 4 is advantageous because the host adaptors 4, 6, 24 or 26 do not remain off-line while data is being destaged from cache in the event one of the clusters fails. Instead, an indication in NVS will be made of those tracks having modified data in cache. Preferred embodiments make a tradeoff of reducing the time during which the host adaptors 4, 6, 24 and 26 are kept off-line versus insuring that all modified data is destaged from cache. However, the likelihood of a second cluster failing during the destaging of modified data from cache is low. Moreover, as discussed with respect to FIG. 5, in the unlikely event of a subsequent failure of the second cluster before all data is destaged from cache 10 or 30, data integrity is maintained because the storage controller 2 can determine from the track IDs maintained in the NVS those tracks having modified data in cache when the entire system went down. Thus, the storage controller 2 will not return stale data from the DASDs 46 or 48 to the hosts for those tracks that are indicated as modified in NVS 8 or 28.

The logic of FIGS. 3, 4, and 5 improves system performance by allowing the hosts to continue issuing transactions to the storage controller 2 and at the same time maintaining data integrity. This is a significant improvement over systems that take the storage controller off-line during destaging operations because the costs of preventing the hosts from issuing critical or important transactions may be significant, i.e., not allowing bank customers to transact business electronically.

CONCLUSION

This concludes the description of the preferred embodiments of the invention. The following describes some alternative embodiments for accomplishing the present invention.

The preferred embodiments are implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a read only random access memory, magnetic storage media, "floppy disk," CD-ROM, a file server providing access to the programs via a network transmission line, holographic unit, etc. Of course, those skilled in the art will recognize many modifications may be made to this configuration without departing from the scope of the present invention.

Preferred embodiments were described with respect to sequential and non-sequential data. However, those skilled in the art will appreciate that the algorithms of the preferred embodiments could be applied to any different types of data being stored in a storage device.

Preferred embodiments of the storage controller are described with respect to a storage controller having a specific two cluster arrangement. However, those skilled in the art will recognize that the failover and failback procedures could apply to storage controllers having different components and a different architecture from the storage controller described with respect to FIG. 1. For instance, the storage controller may include additional clusters, a different interface arrangement between the host adaptors and the processor and between the processor and the device adaptors. Still further, a different arrangement and/or number of host adaptors, device adaptors, processors, DASDs, LSS tracks, etc., could be used. Examples of alternative storage controller embodiments in which the algorithms of the present invention may be implemented, include the storage architecture of the IBM 3990 Storage Controller and other similar controllers, and the controller described in the commonly assigned patent application, entitled "Failure System for a Multiprocessor Storage Controller," Ser. No. 09/026,622, which application was incorporated herein by reference above.

Still further, the DASDs are described as being magnetic units. However, in alternative embodiments the DASDs could be optical memory devices, tape drives, holographic units, etc. Yet further, the DASDs could be organized into a plurality of RAID array structures. Still further, the components of the storage controller 2, including the clusters 0, 1, host adaptors 4, 6, 24, 26, host adaptor bridge 44, NVS 8, 28, processors 12, 32, cache 30, device adaptor bus 14, 34, and device adaptors 16, 18, 20, 22, 36, 38, 40, 42 and functions performed thereby may be implemented with hardware logic (e.g., gates and circuits), firmware or a combination thereof. Moreover, events may occur at times different than order presented in the flowcharts of FIGS. 2–4.

The logic of FIGS. 2–5 described certain events as occurring in a certain order. However, those skilled in the art will appreciate that certain steps may be added, removed or the ordering of the steps altered without departing from the scope of the invention.

In summary, preferred embodiments disclose a system and method for caching data. A processor receives data from a host to modify a track in a first storage device. The processor stores a copy of the modified data in a cache and indicates in a second storage device the tracks for which there is modified data in cache. During data recovery operations, the processor processes the second storage device and data therein to determine the tracks for which there was modified data in cache. The processor then marks the determined tracks as failed to prevent data at the determined tracks in the first storage device from being returned in response to a read request until the failure is resolved. In further embodiments, in response to detecting a partial failure within the storage system, the processor would scan the cache to determine tracks for which there is modified data stored in the cache. The processor then stores in the second storage device information indicating the tracks having modified data in cache and schedules the destaging of the modified data from the cache to the first storage device. The processor is further capable of receiving and processing read/write requests directed to the first storage device before all the modified data is destaged from cache.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for caching data, comprising:
   receiving data to modify a track in a first storage device;
   storing a copy of the modified data in a cache;
   indicating in a second storage device the tracks for which there is modified data in cache, wherein a backup copy operation of the modified data in tracks in the cache marked as modified is not initiated before destaging the cache tracks marked as modified to the first storage device;
   processing the second storage device and data therein in response to detecting a failure to determine the tracks for which there was modified data in cache; and
   marking the determined tracks as failed to prevent data at the determined tracks in the first storage device from being returned in response to a read request until the failure is resolved.

2. The method of claim 1, wherein the determined tracks are only marked as failed in the second storage device if they cannot be successfully destaged after detecting the failure.

3. The method of claim 1, further comprising:
   making a backup copy of modified data in cache to the second storage device that is not indicated as modified in the second storage device after storing a copy of the modified data in the cache.

4. The method of claim 3, wherein the backup copy of the modified data in the cache that is not indicated as modified in the second storage device is in the second storage device.

5. The method of claim 3, wherein after detecting the failure, destaging data in the cache indicated as modified in the second storage device before destaging the data in cache not indicated as modified.

6. A method for caching data, comprising:
   receiving data to modify a track in a first storage device;
   storing a copy of the modified data in a cache;
   determining whether the received data is one of sequential data and random data; indicating in the second storage device the tracks having modified data in cache after determining that the received data is sequential data;
   processing the second storage device and data therein in response to detecting a failure to determine the tracks for which there was modified data in cache; and
   marking the determined tracks as failed to prevent data at the determined tracks in the first storage device from being returned in response to a read request until the failure is resolved.

7. The method of claim 6, further comprising the step of storing the modified data for the track in the second storage device after determining that the received data is random data.

8. A system for caching data received from a host system, wherein the storage system is capable of processing read/write operations from a host system and reading and writing to a first storage device including data tracks, comprising:
   a processor;
   a cache in communication with the processor;
   a second storage device for backing-up data stored in the cache;
   control logic executed by the processor, comprising:
      (i) means for receiving data to modify a track in the first storage device;
      (ii) means for indicating in the second storage device the tracks for which there is modified data in cache, wherein a backup copy operation of the modified data in tracks in the cache marked as modified is not initiated before destaging the cache tracks marked as modified to the first storage device;
      (iii) means for processing the second storage device and data therein in response to detecting a failure to determine the tracks for which there was modified data in cache; and (iv) means for marking the determined tracks as failed to prevent data at the determined tracks in the first storage device from being returned in response to a read request until the failure is resolved.

9. The system of claim 8, wherein the determined tracks are only marked as failed in the second storage device if they cannot be successfully destaged after detecting the failure.

10. The system of claim 8, wherein the control logic executed by the processor further performs:
   making a backup copy of modified data in cache to the second storage device that is not indicated as modified in the second storage device after storing a copy of the modified data in the cache.

11. The system of claim 10, wherein the backup copy of the modified data in the cache that is not indicated as modified in the second storage device is in the second storage device.

12. The system of claim 10, wherein after detecting the failure, destaging data in the cache indicated as modified in the second storage device before destaging the data in cache not indicated as modified.

13. A system for caching data received from a host system, wherein the storage system is capable of processing read/write operations from a host system and reading and writing to a first storage device including data tracks, comprising:
   a processor;
   a cache in communication with the processor;
   a second storage device for backing-up data stored in the cache;
   control logic executed by the processor, comprising:
      (i) means for receiving data to modify a track in the first storage device;
      (ii) means for determining whether the received data is one of sequential data and random data;
      (iii) means for indicating in the second storage device the tracks having modified data in cache after determining that the received data is sequential data;
      (iv) means for processing the second storage device and data therein in response to detecting a failure to determine the tracks for which there was modified data in cache; and
      (v) means for marking the determined tracks as failed to prevent data at the determined tracks in the first storage device from being returned in response to a read request until the failure is resolved.

14. The system of claim 13, wherein the control logic further comprises means for storing the modified data for the track in the second storage device after determining that the received data is random data.

15. A storage system for caching data received from a host system, wherein the storage system is capable of processing read/write operations from a host system, comprising:
   a processor;
   a cache in communication with the processor;
   a first storage device storing data tracks, wherein the processor is capable of reading and writing to data tracks in the first storage device;
   a second storage device for backing-up data stored in the cache;
   control logic executed by the processor, comprising:
      (i) means for receiving data to modify a track in the first storage device;
      (ii) means for indicating in the second storage device the tracks for which there is modified data in cache, wherein a backup copy operation of the modified data in tracks in the cache marked as modified is not initiated before destaging the cache tracks marked as modified to the first storage device; and
      (iii) means for processing the second storage device and data therein in response to detecting a failure to determine the tracks for which there was modified data in cache; and
      (iv) means for marking the determined tracks as failed to prevent data at the determined tracks in the first storage device from being returned in response to a read request until the failure is resolved.

16. The system of claim 15, wherein the determined tracks are only marked as failed in the second storage device if they cannot be successfully destaged after detecting the failure.

17. The system of claim 15, wherein the control logic executed by the processor further performs:
   making a backup copy of modified data in cache to the second storage device that is not indicated as modified in the second storage device after storing a copy of the modified data in the cache.

18. The system of claim 17 wherein the backup copy of the modified data in the cache that is not indicated as modified in the second storage device is in the second storage device.

19. The system of claim 17, wherein after detecting the failure, destaging data in the cache indicated as modified in the second storage device before destaging the data in cache not indicated as modified.

20. A storage system for caching data received from a host system, wherein the storage system is capable of processing read/write operations from a host system, comprising:
   a processor;
   a cache in communication with the processor;
   a first storage device storing data tracks, wherein the processor is capable of reading and writing to data tracks in the first storage device;
   a second storage device for backing-up data stored in the cache;
   control logic executed by the processor, comprising:
      (i) means for receiving data to modify a track in the first storage device;
      (ii) means for determining whether the received data is one of sequential data and random data;
      (iii) indicating in the second storage device the tracks having modified data in cache after determining that the received data is sequential data;
      (iv) means for processing the second storage device and data therein in response to detecting a failure to determine the tracks for which there was modified data in cache; and
      (v) means for marking the determined tracks as failed to prevent data at the determined tracks in the first storage device from being returned in response to a read request until the failure is resolved.

21. A data processing system for caching data, comprising:
   a processor;
   a host system, wherein the processor is capable of processing read/write operations from the host system;
   a cache in communication with the processor;
   a first storage device storing data tracks, wherein the processor is capable of reading and writing to data tracks in the first storage device;

a second storage device for backing-up data stored in the cache;

control logic executed by the processor, comprising:
(i) means for receiving data to modify a track in the first storage device;
(ii) means for indicating in the second storage device the tracks for which there is modified data in cache, wherein a backup copy operation of the modified data in tracks in the cache marked as modified is not initiated before destaging the cache tracks marked as modified to the first storage device;
(iii) means for processing the second storage device and data therein in response to detecting a failure to determine the tracks for which there was modified data in cache; and
(iv) means for marking the determined tracks as failed to prevent data at the determined tracks in the first storage device from being returned in response to a read request until the failure is resolved.

22. The system of claim 21, wherein the determined tracks are only marked as failed in the second storage device if they cannot be successfully destaged after detecting the failure.

23. The system of claim 24, wherein the control logic executed by the processor further performs:
making a backup copy of modified data in cache to the second storage device that is not indicated as modified in the second storage device after storing a copy of the modified data in the cache.

24. The system of claim 23, wherein the backup copy of the modified data in the cache that is not indicated as modified in the second storage device is in the second storage device.

25. The system of claim 23, wherein after detecting the failure, destaging data in the cache indicated as modified in the second storage device before destaging the data in cache not indicated as modified.

26. A data processing system for caching data, comprising:
a processor;
a host system, wherein the processor is capable of processing read/write operations from the host system;
a cache in communication with the processor;
a first storage device storing data tracks, wherein the processor is capable of reading and writing to data tracks in the first storage device;
a second storage device for backing-up data stored in the cache;
control logic executed by the processor, comprising:
(i) means for receiving data to modify a track in the first storage device;
(ii) means for determining whether the received data is one of sequential data and random data;
(iii) indicating in the second storage device the tracks having modified data in cache after determining that the received data is sequential data;
(iv) means for processing the second storage device and data therein in response to detecting a failure to determine the tracks for which there was modified data in cache; and
(v) means for marking the determined tracks as failed to prevent data at the determined tracks in the first storage device from being returned in response to a read request until the failure is resolved.

27. An article of manufacture for use in programming a processor to cache data, wherein the processor is capable of receiving read/write requests from a host system to a first storage device, and wherein the processor is capable of writing data to the first storage device, a cache, and a second storage device, the article of manufacture comprising a computer usable medium including at least one computer program embedded therein that is capable of causing the processor to perform the steps of:
receiving data to modify a track in a first storage device;
storing a copy of the modified data in a cache;
indicating in a second storage device tracks for which there is modified data in cache, wherein a backup copy operation of the modified data in tracks in the cache marked as modified is not initiated before destaging the cache tracks marked as modified to the first storage device;
processing the second storage device and data therein in response to detecting a failure to determine the tracks for which there was modified data in cache; and
marking the determined tracks as failed to prevent data at the determined tracks in the first storage device from being returned in response to a read request until the failure is resolved.

28. The article of manufacture of claim 27, wherein the determined tracks are only marked as failed in the second storage device if they cannot be successfully destaged after detecting the failure.

29. The article of manufacture of claim 27, comprising:
making a backup copy of modified data in cache to the second storage device that is not indicated as modified in the second storage device after storing a copy of the modified data in the cache.

30. The article of manufacture of claim 29, wherein the backup copy of the modified data in the cache that is not indicated as modified in the second storage device is in the second storage device.

31. The article of manufacture of claim 29, wherein after detecting the failure, destaging data in the cache indicated as modified in the second storage device before destaging the data in cache not indicated as modified.

32. An article of manufacture for use in programming a processor to cache data, wherein the processor is capable of receiving read/write requests from a host system to a first storage device, and wherein the processor is capable of writing data to the first storage device, a cache, and a second storage device, the article of manufacture comprising a computer usable medium including at least one computer program embedded therein that is capable of causing the processor to perform:
receiving data to modify a track in a first storage device;
storing a copy of the modified data in a cache;
determining whether the received data is one of sequential data and random data;
indicating in the second storage device the tracks having modified data in cache after determining that the received data is sequential data;
indicating in a second storage device tracks for which there is modified data in cache; and
processing the second storage device and data therein in response to detecting a failure to determine the tracks for which there was modified data in cache; and
marking the determined tracks as failed to prevent data at the determined tracks in the first storage device from being returned in response to a read request until the failure is resolved.

33. The article of manufacture of claim 32, wherein the computer program is further capable of causing the processor to perform the step of storing the modified data for the track in the second storage device after determining that the received data is random data.

* * * * *

UNITED STATES PATENT AND TRADEMARK OFFICE
CERTIFICATE OF CORRECTION

PATENT NO. : 6,658,542 B2
DATED : December 2, 2003
INVENTOR(S) : Brent Cameron Beardsley et al.

It is certified that error appears in the above-identified patent and that said Letters Patent is hereby corrected as shown below:

Column 12,
Line 32, after "data;" insert new paragraph.

Column 16,
Line 23, after "27," insert -- further --.

Signed and Sealed this

Eleventh Day of April, 2006

JON W. DUDAS
*Director of the United States Patent and Trademark Office*